United States Patent
Judd

[15] 3,661,048
[45] May 9, 1972

[54] FASTENING MEANS FOR STRUCTURAL MEMBERS

[72] Inventor: Watson M. Judd, Eastlake, Ohio

[73] Assignee: Town Line Erection Company, Incorporated, Mentor, Ohio

[22] Filed: June 16, 1969

[21] Appl. No.: 833,639

[52] U.S. Cl. ................................... 85/7, 85/8.1, 287/189.36
[51] Int. Cl. ........................................................ F16b 21/14
[58] Field of Search ................. 52/665; 85/7, 8.6, 28, 8.1; 287/DIG. 12; 248/206 A, 467; 151/5

[56] References Cited

UNITED STATES PATENTS

| | | |
|---|---|---|
| 34,015 | 12/1961 | Scheener ........................... 85/7 |
| 597,748 | 1/1898 | Shults ................................ 85/7 |
| 1,303,665 | 5/1919 | Hogan ............................... 85/7 |
| 2,468,821 | 5/1949 | Goodstein ......................... 85/28 |
| 2,627,423 | 2/1953 | Copeman .......................... 85/8.1 |
| 2,742,250 | 4/1956 | Cronberger ................... 248/206 A |
| 2,853,746 | 9/1958 | Spencer et al. ................... 85/28 |
| 1,280,756 | 10/1918 | Kelecom ............................. 151/5 |
| 1,390,609 | 9/1921 | France ............................... 85/8.8 |

FOREIGN PATENTS OR APPLICATIONS

| | | |
|---|---|---|
| 393,420 | 6/1933 | Great Britain ..................... 85/8.1 |

*Primary Examiner*—Edward C. Allen
*Attorney*—Sam E. Laub

[57] ABSTRACT

A fastening means for securing structural members including structural beams has an unthreaded bolt having a partially tapered shank, a noncircular head and at least one hole through the shank and a generally rod-shaped locking pin one end of which is capable of fitting in the hole in the shank of the bolt, the locking pin having an eye portion at the other end adapted to receive a tool therethrough to facilitate removal of the locking pin from the bolt and an expanded portion in the locking pin limiting the portion of the locking pin passing through the hole in the bolt.

12 Claims, 7 Drawing Figures

INVENTOR.
WATSON M. JUDD
BY
Sam Lauk

INVENTOR.
WATSON M. JUDD

FASTENING MEANS FOR STRUCTURAL MEMBERS

BACKGROUND OF THE INVENTION

1. Field of the Invention

This invention relates in general to a fastening means for temporarily securing structural members in place and to a method of securing structural members including structural beams in place prior to securing the members with permanent fastening means.

2. Description of the Prior Art

This invention is particularly useful to iron workers in making structural assemblies where two or more beams are to be connected during erection of structural steel building frames. The fastening means of this invention can be used in structural assembly of steel building frames. Currently it is the practice of an iron worker to use a spud wrench as shown in FIG. 1 during erection of structural buildings to aid him in holding two or more structural members in place until he is able to put a threaded bolt and nut (a permanent fastening means) in position to hold the structural members. The spud wrench consists of a wrench head 10, a curved, flattened handle portion 11 and a rounded portion 12 which tapers to a point. During assembly of a building, a series of columns, usually vertical I-beams, are set vertically on their anchor bolts which are securely fastened to the footers of a building foundation. Next two iron workers take positions on top of each of two different vertical columns between which a first beam is to be horizontally fastened. Then the first beam is swung in a horizontal position close to the vertical columns by a crane or hoist device. Each iron worker places the point of the rounded portion 12 of a spud wrench through a hole in the vertical column or through a hole in the first horizontal beam. Each iron worker then moves the end of the first horizontal beam nearest to him toward the vertical column so that the spud wrench enters the corresponding hole in the other structural piece. Each iron worker then aligns the matching holes of the two structural members and holds the members in place while inserting a threaded bolt through another set of matching holes in the two members and fastens a nut on the threaded bolt and draws the two structural members together. The crane connects to another I-beam having a coup out which fits with the holes in the vertical column and the horizontal beam to form a three member connection, and the crane brings this second beam close to the iron worker. Then the iron worker removes the nut from the threaded bolt which creates a hazard to the iron worker as there is a potentially loose structural member. He then attempts to connect the I-beam held by the crane by moving this I-beam so the threaded bolt enters the appropriate hole in the I-beam, and proceeds to fasten the nut on the threaded bolt drawing the three members together.

This method of assembly exposes the iron worker to many possible accidents. He is subject to losing his position and/or losing control of a horizontal beam due to gusts of wind, loose anchor bolts on the vertical column (loosened for alignment of the column), bumping of the structural members by the crane or the iron worker's own carelessness. The loss of control of a member most likely will involve both iron workers on each end of the first horizontal member in a serious accident, called a fall. The high rate of industrial insurance required on such workers is evidence of the frequency of such accidents and the severity of these accidents. The use of a spud wrench can also cause burring of the holes in the structural member with loss of strength around the holes. Many construction contracts specify no burring of the holes of structural members.

SUMMARY OF THE INVENTION

The fastening means disclosed herein enables the assembly of multiple structural members in a secure connection and is particularly suitable for the assembly of structural beams for building frames, alleviating the hazards iron workers encounter using spud wrenches.

Accordingly, it is an object of this invention to provide a method for connecting multiple structural members so that the connection will not fail, but can be quickly released when desired, such as after establishing a permanent connection of the members.

It is an especially preferred object of this invention to provide a method for connecting multiple structural beams for building frames so that a confident connection is established, eliminating any risks to workmen who must necessarily be located on these beams to aid in alignment and assembly of these beams.

It is another object of this invention to provide a connection for a series of multiple structural beams to form the framing of a building which will enable alignment (plumbing) of the beam members as connected, prior to bolting all the holes in the structural members.

Other objects and advantages of this invention reside in the structure, features and arrangements hereinafter more fully described with reference to the accompanying drawings in which FIG. 1 is a spud wrench as currently used in the building trades as stated in the Description of the Prior Art.

FIG. 2 is an unthreaded, tapered bolt and FIG. 3 is a locking pin, the features and utility of which are disclosed in this invention.

FIGS. 4 through 7, respectively, show a pictorial representation of a three member inside webb connection, a jack truss connection, a three ply purlin connection and a three member connection on the side of a vertical column, all of the connections being confidently and securely established through use of the fastening means disclosed herein.

DESCRIPTION OF THE PREFERRED EMBODIMENTS

Figure 1:
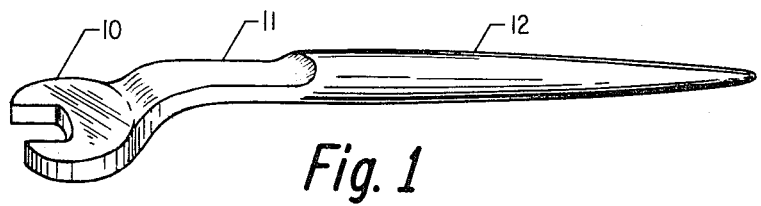
Figure 2:
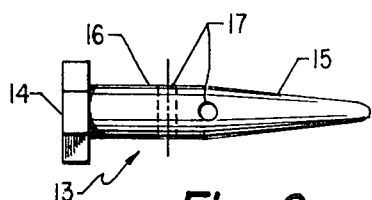
Figure 3:
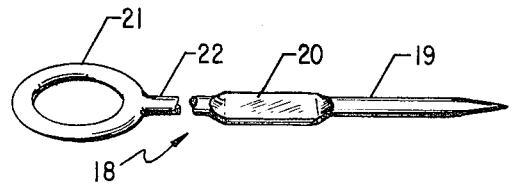

Referring now to the drawings, the fastening means for structural members is shown in FIGS. 2 and 3. In FIG. 2 an unthreaded tapered connecting bolt is shown identified by numeral 13. The bolt has a noncircular head 14 which is readily turned by a wrench, the head 14 limiting passage of the shank 16 through a hole in a structural member, the shank 16 having a partially tapered front portion 15 which can end in a point enabling easy insertion of bolt 13 into holes in structural members and at least one or more holes (apertures) 17, preferably two holes (apertures) 17, transversely through the shank portion 16 a short distance apart and drilled through the stem generally perpendicular to each other as shown in FIG. 2. The tapered forward portion 15 being narrower in diameter than the remainder of the shank 16 of the unthreaded bolt 13 enables the connecting bolt to seek an entry and be inserted into the matching holes of structural members without difficulty. The tapered forward portion 15 can be from less than one-quarter to over one-half the length of the shank 16 and the tapered forward portion 15 can start at approximately the hole 17 closest to the forward portion 15. The forward portion 15 serves to support a third loose structural member after the unthreaded bolt 13 receives a locking pin 18 through one of the holes 17 connecting two structural members together. One embodiment of the bolt useful for establishing a variety of three structural member connections as shown in FIGS. 4 through 7 is fabricated of high strength steel (with other possible materials being aluminum alloys and tool steels). In practice there is no limitation on the size of the bolt as long as the holes in the structural member to be fastened are slightly larger than the shank 16 at its largest diameter and the holes 17 extending through the bolt 13 are slightly larger than the end 19 of the locking pin 18 to be inserted through the holes 17. A typical size range for the bolt, which is in no sense meant to be a limitation on the teaching of this invention and which depends on the size of the structural members being fastened is a shank length of 3 to 6 inches and a shank diameter of five-eighths to 1 inch. When two holes are drilled through the shank, the one closest to the head is usually three-quarters to 1½ inches from the head and the second hole is usually 1¾ to 3½ inches from the point of the tapered end. Typically ¼-inch (± one-sixteenth inch) holes 17 are drilled through the shank of the bolt. The distance between the holes 17 usually varies between one-half inch to 1 inch. The dimensions of the bolt will vary as the size of the structural members being fastened varies with the foregoing merely being representative dimensions for some common structural members. Where needed one or more washers can be placed on the shank 15 of bolt 13 to give a tighter connection of structural members.

Adapted to fit through the holes 17 in bolt 13 is the forward end 19 of locking pin 18 having rod-shaped insert section 19 and rod-shaped body section 22 (which is partially cut away in FIG. 3) being divided by stop 20 which is an expanded portion of the locking pin limiting the entry of the insert section 19 of the pin 18 entering a hole 17 in the bolt 13. Rod-shaped portion 22 of locking pin 18 ends in an eye 21 forming a handle portion which is of suitable size to receive an instrument inserted therethrough to aid in quickly removing the locking pin from the unthreaded bolt 13. In order to enable rapid and easy insertion of the locking pin 18 into openings 17 in unthreaded bolt 13, the forward end 19 of locking pin 18 is tapered to a point. The important dimensions of locking pin 18 are for the insert section 19 to be slightly smaller in diameter than the holes 17 in bolt 13 enabling a snug fit of insert section 19 into holes 17 of bolt 13, and the stop 20 to be larger in diameter than the holes 17 in bolt 13. One optional but desirable feature of the locking pin 18 is to have the insert section 19 have magnetic properties sufficient to overcome the force of gravity so that the locking pin 18 will not fall out of the transverse holes 17 in bolt 13 even when the bolt is turned so the eye 21 of the locking pin 18 is toward the ground. This assures that the locking pin will not be accidentally removed from the bolt 13 and it will only be removed upon application of force overcoming the magnetic properties of the locking pin. The cost of magnetizing the insert section 19 is nominal. The locking pin may also be made of high strength steel or tool steel, and when magnetic properties are imparted to the insert section 19, the unthreaded, tapered bolt 13 is made of high strength steel or tool steel. While the holes 17 and the insert section 19 are shown as being circular, other shapes such as square slots and square shapes could be utilized.

As used herein the term "structural member" includes any element designed to be connected to a similar or different element which is capable of receiving that connection. This includes all forms of beams and components connected for purposes of forming the framing of a building, e.g., an I-beam, and it also includes components in the airframe industry and the shipbuilding industry, such as aluminum skin portions, wing portions and ship structural plates. Also included are the structural components for large land vehicles such as tanks. The fastening means of this invention and its method can be used wherever structural components of a unit are to be assembled to form the unit.

One of the preferred uses of the fastening means disclosed herein is in the building erection industry as shown in FIGS. 4 through 7. In general practice, there are two members, such as I-beams, in an established connected position, for example as vertical columns or horizontal leading columns, to which one or more structural members are to be fastened. One workman assumes a position on each of the established structural members equipped with several unthreaded bolts 13 and locking pins 18 as taught and disclosed in this invention along with several permanent fastening means. A crane or hoist brings the next (third) structural member with a matching set of holes therein close to the workman who manually brings the holes in the loose (third) structural member into an approximate, adjacent alignment with the holes in the established structural member on which he is situated at which time the workman inserts at least one unthreaded, tapered bolt 13 into the holes in the two structural members and preferably uses two bolts 13 to prevent lateral movement of the loose member and pulls the members tightly together on the bolts. It is preferable that the workman insert the bolts 13 into the upper holes in the members to later enable easy release of the locking pins 18. Also since one end of the loose member is fastened first with the other end positioned above or to one side of the opposite established member, the bolts 13 act as a hinge at the fastened end for lowering the loose end of the beam in alignment with the opposite established member.

After inserting the bolts 13, the worker next inserts a locking pin 18 into the hole 17 in bolt 13 closest to the two structural members, and this connects the loose structural member against the established structural member. Another workman makes connection of the other end of the loose structural member to the opposite established structural member. This presents a much more secure initial fastening for the workman than the use of a spud wrench. At the election of the workman, he may at this time also insert a threaded bolt in another set of matching holes in the structural members and fasten a nut on the threaded bolt, but this nut must be removed when the fourth (loose) structural member is to be connected.

After the crane is freed from the third member, it connects to a fourth (loose) structural member having a matching set of holes adapted to fit with the two fastened members in the structural building frame and brings this loose member close to the two fastened members. At this point the workman aids in guiding the loose member so that the forward portion 15 of bolts 13 enter the appropriate matching holes in the loose member and the bolts support the loose member. Then the workman can hold the third member in place on bolts 13 and secure the three members with a permanent fastening means (a threaded bolt and nut) or he can insert a second locking pin 18 into a second hole 17 toward the forward portion 15 of bolt 13 followed by placing permanent fastening means (e.g. a threaded bolt and nut) through the second or third holes in each set of holes in the three members and securing the nut on the threaded bolt. After the nut and bolt are secured, the locking pins 18 are taken from the unthreaded bolts 13 and the bolts 13 are driven from the holes or rotated from the holes with a wrench being applied to the noncircular head 14 of bolts 13. The nut and threaded bolt combinations holding the three members are then tightly secured.

Figure 4:
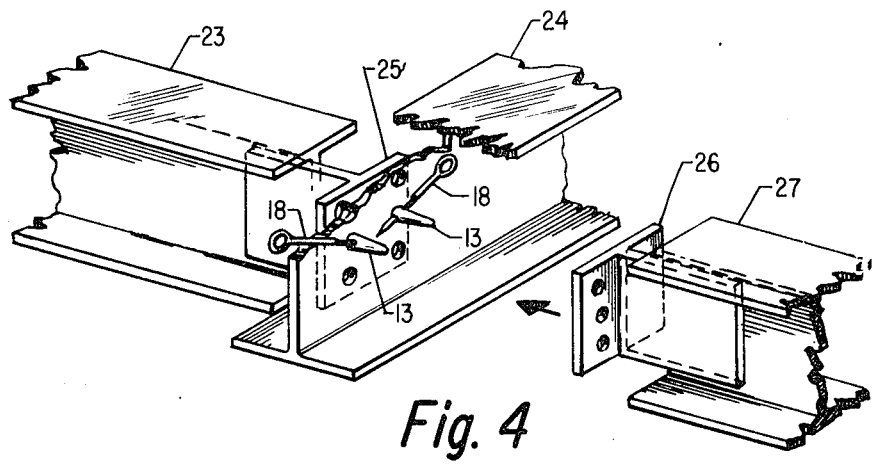

The foregoing general description of the use of the fastening means of this invention will now be applied to exemplary types of connections possible through use of the fastening means of this invention. FIG. 4 shows the final assembly stages of a three member inside webb connection of two lug beams 23 and 27 with a roof beam 24. Here the holes of loose beam 24 are already in position with the corresponding holes in beam 23 so that the unthreaded bolts 13 are inserted through the holes in clip angle 25 of beam 23 into the matching holes in roof beam 24 and this beam 24 is drawn into an abutting relationship with lug beam 23. Then the lock pins 18 are inserted into the holes 17 closest to the member 24 in bolts 13. This establishes a secure connection of beam 24 to beam 23 and further establishes a connection which will not be subject to lateral movement of beam 24. Another workman makes the connection of the other end of roof beam 24 to another established column in like manner. At the election of the workman a threaded bolt can be inserted at this time through another set of matching holes in beams 23 and 24 and a nut fastened thereon which must be removed before beam 27 can be put into place. Next the crane is disengaged from beam 24 and is connected to a lug beam 27 which it brings close to beams 23 and 24. The workman guides clip angle or lug plate 26 of beam 27 close to beam 24 so that the forward portion 15 of bolts 13 enter the matching holes in lug plate 26. As stated previously the workman can either insert a second locking pin 18 into the hole 17 toward forward portion 15 of bolts 13 to secure the beam 27 before inserting the threaded bolt and placing a nut on the threaded bolt or he can simply manually hold the member 27 in place on the forward portion 15 of bolt 13 while inserting a threaded bolt and securing a nut in the threaded bolt. Another workman makes the connection of the other end of lug beam 27 to another established column in like manner. Then the locking pins 18 are removed from the bolts 13 and the bolts 13 are driven or turned from the three beam members after which the nut and threaded bolt combination is tightly connected followed by securing other nut and threaded bolt combinations in the matching holes in the three members.

Figure 5:
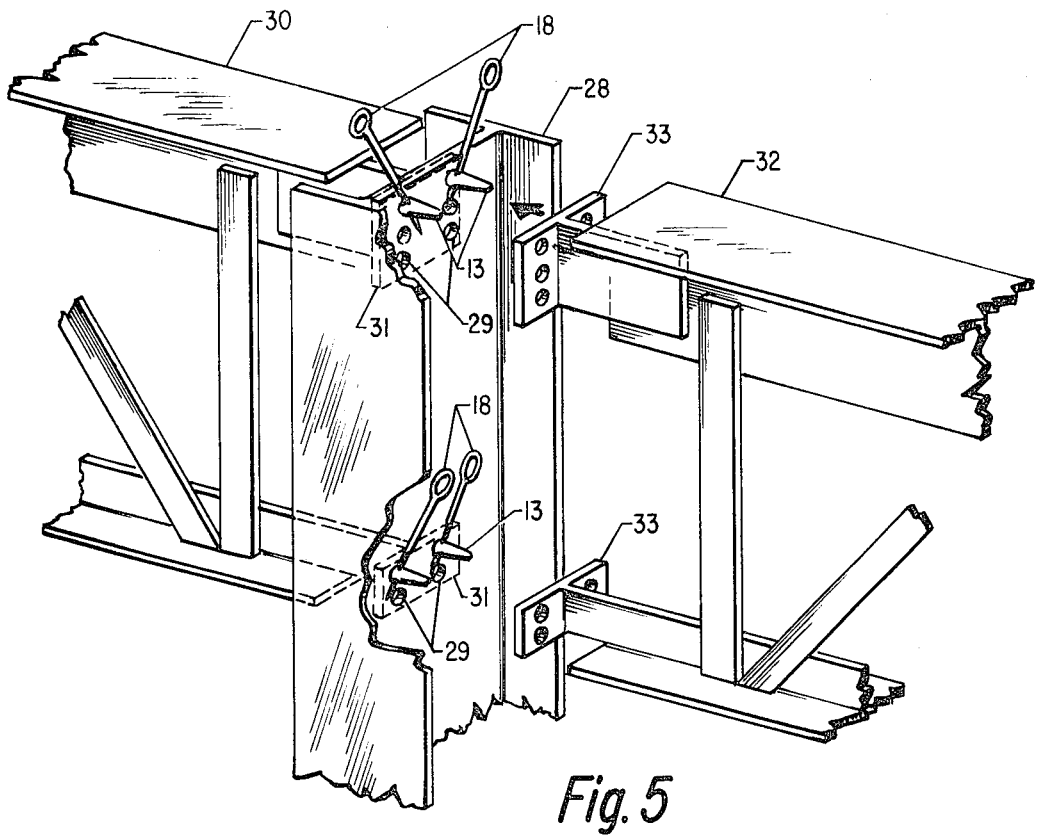

FIG. 5 presents the final assembly stages of a jack truss connection using the fastening means of this invention. Here a vertical I-beam 28 having two different sets of holes 29 is secured to a footer or substructure of a building frame and the crane brings member 30 close to beam 28 with a workman near clip angles 31 on each end of member 30 who help the crane achieve an approximate alignment of the holes in beam 28 and member 30 prior to inserting an unthreaded bolt 13 (preferably two unthreaded bolts 13) through the top holes in the two beams 28 and 30 and securing them in place by inserting a lock pin 18 into hole 17 in each unthreaded bolt 13. The workman at the end of member 30 not shown in FIG. 5 makes a similar connection to another vertical column. At the election of the workman, a threaded bolt can be inserted through another set of matching holes and a nut fastened on the threaded bolt. The nut must be removed before member 32 can be put into place. Then the crane brings a third member 32 close to member 28 and the workman aids the crane in sliding clip angle 33 onto bolts 13 after which the member 32 is either manually held in place on bolts 13 by the workman or secured with another lock pin 18 through the hole 17 in each bolt 13 nearest the forward portion 15 of bolt 13, after which a permanent connection through use of a nut and threaded bolt is established and the releasable fastening means (bolts 13 and locking pins 18) are removed and the nut and threaded bolt combination is tightened. Another workman makes the connection of the other end of member 32 to another established column in like manner.

Figure 6:
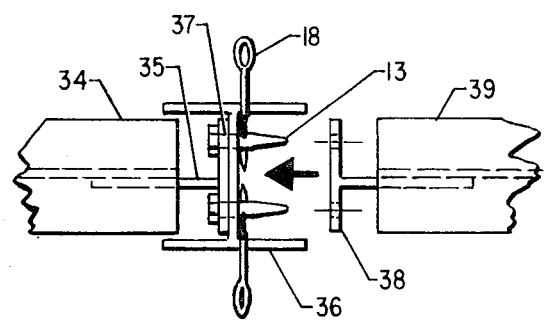

FIG. 6 shows two I-beams 34 and 39 in the final stages of being connected on the inside webb of a vertical column 36. Here vertical column 36 (which is an I-beam) is connected to the building footer or substructure and unthreaded bolts 13 are inserted through the lug holes in the coup out (clip angle) 35 on I-beam 34 and through holes 37 in column 36 and each unthreaded bolt 13 has a locking pin 18 inserted through the bolt which holds beam 34 to column 36. Then beam 39 is aligned and moved so the tapered forward portions 15 of unthreaded bolts 13 enter the holes in lug 38 and beam 39 has its weight resting on the forward portions 15 of unthreaded bolts 13. From here on the methods of securing the third beam 39 as described for the third (loose) members in FIGS. 4 and 5 are practiced with use of nut and threaded bolt combinations to permanently secure the beams together followed by releasing the fastening means (unthreaded bolts 13 and locking pins 18).

Figure 7:
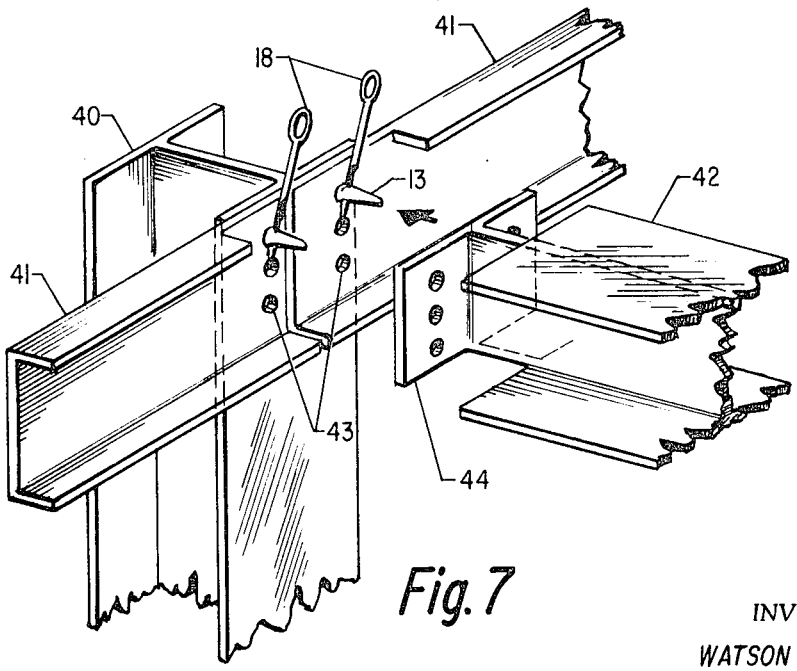

A further connection possible with the fastening means of this invention is shown in FIG. 7 where three different beams are secured to the side of a column 40 using the previously described steps of the assembly method of this invention. Two members 41 are first temporarily secured to vertical column 40 through insertion of unthreaded tapered bolts 13 through the approximately aligned holes in members 40 and 41 followed by inserting locking pins 18 into unthreaded bolts 13 holding members 41 to member 40. Next I-beam 42 is brought adjacent beams 40 and 41 and then guided so the bolts 13 enter the holes in lug 44 of member 42. Member 42 is either manually held in place or secured by locking pins 18 inserted through the holes 17 nearest the tapered forward portion 15 of each unthreaded bolt 13. Then a permanent connection is achieved with a nut and threaded bolt combination followed by removal of the locking pins 18 and unthreaded bolts 13 and tightly securing the nut and threaded bolt combinations.

FIGS. 3 through 7 have shown some of the connections of three or more structural members in the erection of buildings that can be accomplished with safety of the workmen involved through use of the fastening means of this invention. This invention can be used to secure two structural members until a permanent fastening can be used, e.g., where detailed alignment of the members must be made before the permanent fastening is secured. Detailed alignment (plumbing) can be made for assemblies of three or more structural members. Further, this invention can be used in other phases of industry where multiple structural members are to be assembled including the ship-building industry where large plate sections must be held in place for permanent fastening (by riveting), the airframe industry where large components are to be held in place for permanent fastening and for holding partitions and temporary wall sections in buildings. From the Figures accompanying this specification, there has been presented a method for fastening multiple structural members having matching holes therein through the steps of bringing the matching holes of the structural members in an approximate alignment, securing the structural members together by placing an unthreaded bolt through the matching holes of the structural members, said bolt having a partially tapered shank, a noncircular head and at least one hole transversely through the shank of the bolt, and inserting a locking pin through the hole in the shank of the unthreaded bolt. The method also includes the subsequent step of bringing another structural member having holes matching those of the first two members into place so the unthreaded bolts fit through the holes in this loose member and the member is held in place on the unthreaded bolts until secured with a locking pin or a permanent fastening means (a threaded bolt and nut).

The unthreaded tapered bolt 13 and the locking pin 18 are inexpensive to fabricate and can be fabricated by a number of techniques of which the following is exemplary. The unthreaded tapered bolts 13 of this invention can be fabricated by stamping or cold forming the shank to give the desired taper followed by hardening the bolt. The locking pin 18 can be made from round stock of desired diameter. The eye portion 21 can be formed by bending the end of the round stock into a loop followed by welding shut the loop. The stop 20 (enlarged portion) can be made by stamping flat the round stock at the desired location of the stop. The insert portion 21 is usually tapered to a point to aid in inserting it into the holes 17 in bolt 13. The holes 17 can be formed in bolt 13 by drilling or stamping.

It will be understood that the particular application of the fastening means of this invention is not limited by the included examples or the specific applications shown and described herein, and it will be understood that various omissions and substitutions and changes in form and details of the device illustrated and in its operation may be made by those skilled in the art without departing from the spirit of the invention. It is the intention, therefore to be limited only as indicated by the scope of the claims appended hereto.

I claim:

1. A fastening means for securing structural members in place capable of being easily released from the members, comprising
   a. an unthreaded bolt having
      i. a partially tapered shank,
      ii. a noncircular head and
      iii. at least one hole through the shank portion of the bolt; and
   b. a locking pin with a generally round, solid stem having
      i. one end of the stem being tapered and adapted to fit into the at least one hole in the bolt,
      ii. an expanded, elongated, solid portion in the round stem of the locking pin limiting the end of the stem fitting into the hole in the bolt and,
      iii. an eye portion being separated from the expanded portion by a portion of the round stem, the eye portion being capable of receiving an instrument therethrough to facilitate removal of the locking pin.

2. The fastening means of claim 1 where the end of the locking pin adapted to fit into the hole in the bolt is magnetized and the bolt is formed of magnetic material.

3. The fastening means of claim 1 where at least one washer is placed on the shank near the head of the unthreaded bolt.

4. The fastening means of claim 1 where the unthreaded bolt is made from high strength steel.

5. The fastening means of claim 1 where the shank of the unthreaded bolt has multiple holes drilled therethrough.

6. The fastening means of claim 1 where the unthreaded bolt has a hexagonal head.

7. The fastening means of claim 1 where at least one fourth of the stem end of the unthreaded bolt is tapered.

8. The fastening means of claim 1 in which the unthreaded bolt has two holes through the shank portion.

9. The fastening means of claim 1 in which the unthreaded bolt has one hole through the shank portion.

10. The fastening means of claim 1 in which the unthreaded bolt has two holes through the shank portion generally perpendicular to each other.

11. The fastening means of claim 1 where the unthreaded bolt is made from a tool steel.

12. The fastening means of claim 1 where the locking pin is made from high strength steel.

* * * * *